(12) United States Patent
Sills et al.

(10) Patent No.: US 10,997,311 B1
(45) Date of Patent: May 4, 2021

(54) SETTING ACCESS CONTROLS FOR A CONTENT ITEM

(71) Applicant: Google LLC, Mountain View, CA (US)

(72) Inventors: Maxwell Andrew Sills, San Francisco, CA (US); Ian Wetherbee, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/595,397

(22) Filed: Oct. 7, 2019

Related U.S. Application Data

(63) Continuation of application No. 15/607,351, filed on May 26, 2017, now abandoned, which is a continuation of application No. 14/675,637, filed on Mar. 31, 2015, now Pat. No. 9,665,733.

(51) Int. Cl.
*G06F 21/62* (2013.01)
*H04L 29/06* (2006.01)

(52) U.S. Cl.
CPC .......... *G06F 21/6218* (2013.01); *H04L 63/20* (2013.01)

(58) Field of Classification Search
CPC .............................. G06F 21/6218; H04L 63/20
See application file for complete search history.

(56) References Cited

U.S. PATENT DOCUMENTS

| | | | |
|---|---|---|---|
| 7,693,827 B2 | 4/2010 | Zamir et al. | |
| 7,949,611 B1 | 5/2011 | Nielsen et al. | |
| 8,560,678 B2 | 10/2013 | Tseng | |
| 8,606,776 B2 * | 12/2013 | Steiner | G06F 16/58 707/723 |
| 8,700,708 B2 | 4/2014 | Richter et al. | |
| 8,838,621 B1 | 9/2014 | Yagnik | |
| 9,204,247 B2 | 12/2015 | Liu et al. | |
| 9,531,823 B1 * | 12/2016 | Suchland | H04L 67/22 |
| 2012/0047448 A1 | 2/2012 | Amidon et al. | |

(Continued)

OTHER PUBLICATIONS

Squicciarini, A.C., Shehab, M. & Wede, J. Privacy policies for shared content in social network sites. The VLDB Journal 19, 777-796 (2010). https://doi.org/10.1007/s00778-010-0193-7 (Year: 2010).*

(Continued)

*Primary Examiner* — Chau Le
(74) *Attorney, Agent, or Firm* — Lowenstein Sandler LLP

(57) ABSTRACT

A system and method are provided for setting access controls for a content item, the method comprising receiving a content item generated in association with a first online profile, determining contextual information associated with the content item, identifying, based on the determined contextual information, a second online profile associated with the content item, obtaining a first access control policy of the first online profile and a second access control policy of the second online profile, wherein each of the first access control policy and the second access control policy is associated with controlling access to the content item, determining, based on the obtained first access control policy and the second access control policy, a third access control policy for controlling access to the content item, and controlling access to the content item based on the determined third access control policy.

20 Claims, 5 Drawing Sheets

(56) References Cited

U.S. PATENT DOCUMENTS

| | | | |
|---|---|---|---|
| 2012/0215771 A1* | 8/2012 | Steiner | G06F 16/5854 |
| | | | 707/723 |
| 2013/0276134 A1 | 10/2013 | Meredith et al. | |
| 2013/0286223 A1 | 10/2013 | Latta et al. | |
| 2013/0347056 A1* | 12/2013 | Kuhlman | G06F 21/10 |
| | | | 726/1 |
| 2014/0115049 A1 | 4/2014 | Anderson et al. | |
| 2014/0222339 A1 | 8/2014 | Abhyanker | |
| 2015/0036004 A1* | 2/2015 | Harwell | H04L 67/26 |
| | | | 348/207.11 |
| 2015/0135261 A1* | 5/2015 | Park | H04L 63/102 |
| | | | 726/1 |
| 2015/0242063 A1* | 8/2015 | Lindo | G06F 3/0481 |
| | | | 715/753 |
| 2015/0269383 A1* | 9/2015 | Lang | H04L 63/20 |
| | | | 726/1 |
| 2015/0341369 A1* | 11/2015 | Bosworth | G06F 21/6218 |
| | | | 726/4 |
| 2016/0026821 A1* | 1/2016 | Meredith | H04L 63/102 |
| | | | 726/1 |

OTHER PUBLICATIONS

Praveena et al., "Online Social Networks for a Multiparty Access Control Model and Mechanisms", Retrieved From https://pdfs.semanticscholar.org/6f30/35b90b576630350aa92ca2871bc6132ea25-2.pdf, Published Dec. 2013.

Yildiz et al., "Detecting Social Cliques for Automated Privacy Control in Online Social Networks," Pervasive Computing and Communications Workshops, Mar. 2012, pp. 353-359, IEEE, Lugano, Switzerland.

\* cited by examiner

SETTING ACCESS CONTROLS FOR A CONTENT ITEM

CROSS-REFERENCE TO RELATED APPLICATIONS

This application is a continuation application of co-pending U.S. patent application Ser. No. 15/607,351, filed May 26, 2017, which is a continuation application of U.S. patent application Ser. No. 14/675,637, filed Mar. 31, 2015, now U.S. Pat. No. 9,665,733 which is herein incorporated by reference.

BACKGROUND

The present disclosure generally relates to access controls, and in particular, to setting access controls for a content item.

Social networking services allow users to create and share content items such as pictures, videos, posts, and events with other users. Users may control access to the content items that they created by setting one or more access control policies. Other than the user who created the content item, some related users (e.g., a user tagged in a photo captured by another user, a parent of a user) may also be provided with some access control for the content item.

SUMMARY

The disclosed subject matter relates to a computer-implemented method of setting access controls for a content item. The method comprises receiving a content item generated in association with a first online profile. The method further comprises determining contextual information associated with the content item. The method further comprises identifying, based on the determined contextual information, a second online profile associated with the content item. The method further comprises obtaining a first access control policy of the first online profile and a second access control policy of the second online profile, wherein each of the first access control policy and the second access control policy is associated with controlling access to the content item. The method further comprises determining, based on the obtained first access control policy and the second access control policy, a third access control policy for controlling access to the content item. In addition, the method comprises controlling access to the content item based on the determined third access control policy.

The disclosed subject matter further relates to a system for setting access controls for a content item. The system comprises one or more processors, and a machine-readable medium comprising instructions stored therein, which when executed by the processors, cause the processors to perform operations comprising receiving a content item generated in association with a first online profile. The operations further comprise determining contextual information associated with the content item. The operations further comprise identifying, based on the determined contextual information, a second online profile associated with the content item. The operations further comprise obtaining a first access control policy of the first online profile and a second access control policy of the second online profile, wherein each of the first access control policy and the second access control policy is associated with controlling access to the content item. The operations further comprise determining, based on the obtained first access control policy and the second access control policy, a third access control policy for controlling access to the content item. In addition, the operations comprise controlling access to the content item based on the determined third access control policy, wherein identifying the second online profile is based on data from a social networking service regarding the first online profile or the second online profile.

The disclosed subject matter also relates to a machine-readable medium comprising instructions stored therein, which when executed by a system, cause the system to perform operations comprising receiving a content item generated in association with a first online profile. The operations further comprise determining contextual information associated with the content item. The operations further comprise identifying, based on the determined contextual information, a second online profile associated with the content item. The operations further comprise obtaining a first access control policy of the first online profile and a second access control policy of the second online profile, wherein each of the first access control policy and the second access control policy is associated with controlling access to the content item. The operations further comprise determining, based on the obtained first access control policy and the second access control policy, a third access control policy for controlling access to the content item. In addition, the operations comprise controlling access to the content item based on the determined third access control policy, wherein each of the first online profile and the second online profile correspond to a user, a location or a physical object.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
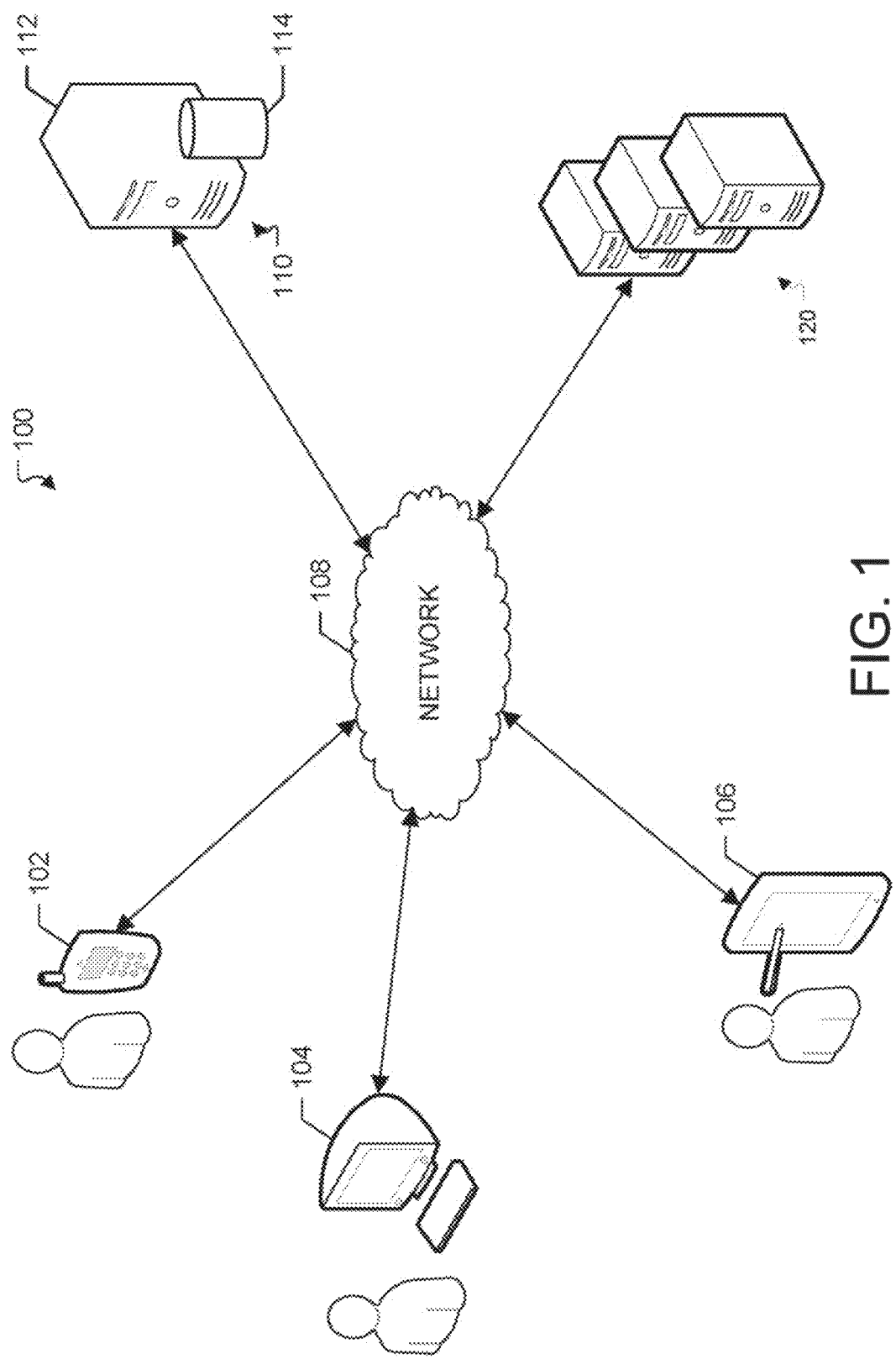
FIG. 1 illustrates an example network environment in which information can be provided for setting access controls for a content item.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, social networking services allow users to create and share content items such as pictures, videos, posts, and events with other users. Users may control access to the content items that they created by setting one or more access control policies. Other than the user who created the content item, some related users (e.g., a user tagged in a photo captured by another user, a parent of a user) may also be provided with some access control for the content item.

However, users may find it difficult to set access controls for the content items. Specifically, a user may need to identify and manually select an access control list including a list of users granted access to a content item. In addition, the user may not easily set access rights (e.g., levels of access) for the users that are granted access to the content item. Furthermore, a content item may be associated with different access control settings from different users, such as the user who created the content item and related users associated with the content item.

The subject disclosure provides for setting access controls for a content item. A content item generated in association with a first online profile is received by a server. Contextual information associated with the content item is determined. The contextual information may comprise at least one of geographical information, temporal information, and environmental information.

Based on the contextual information, a second online profile associated with the content item is identified. In some aspects, identifying the second online profile may be based on data from a social networking service regarding the first online profile or the second online profile. Each of the first online profile and the second online profile may correspond to a user, a location or a physical object. In example aspects, determining the contextual information may comprise determining a type of geographical location associated with the content item, and identifying the second online profile may be based on the determined type of geographical location and at least one of the first access control policy or the second access control policy.

A first access control policy of the first user and a second access control policy of the second user are obtained. Each of the first access control policy and the second access control policy is associated with controlling access to the content item. In some aspects, each of the first access control policy and the second access control policy may comprise a policy for at least one of owning, editing, deleting or sharing the content item.

In some aspects, the first access control policy and the second access control policy may be based on user-specified preferences by the first online profile and the second online profile, respectively. Alternatively or in addition, the first access control policy and the second access control policy may be based on activity within a social networking service corresponding to the first online profile and the second online profile, respectively.

A third access control policy for controlling access to the content item is determined based on the first access control policy and the second access control policy. In some aspects, the first access control policy and the second access control policy may be compared. Conflicts between the first access control policy and the second access control policy may be identified based on the comparison. The conflicts may be resolved based on a conflict-resolution rule. Access to the content item is controlled based on the determined third access control policy.

FIG. 1 illustrates an example network environment in which information can be provided for setting access controls for a content item. A network environment 100 includes computing devices 102, 104 and 106 (hereinafter "102-106") and server 110 and servers 120.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, a wearable device (e.g., a smart watch, a pair of smart glasses, a smart arm band device) or a combination of any these data processing devices or other data processing devices that can be used to for generating a content item. Computing devices 102-106 and 112 may be provided access to or receive application software executed or stored on any of the other computing systems 102-106 and 112. In the example of FIG. 1, computing device 102 is depicted as a smartphone, computing device 104 is depicted as a desktop computer, and computing device 106 is depicted as a PDA.

Server 110 can include one or more computing devices 112 and one or more computer-readable storage devices 114 (e.g., data stores). Server 110 may be a system or device having a processor, a memory, and communications capability for providing content and/or services to client devices. In some example aspects, server 110 can be a single computing device, for example, a computer server. In other embodiments, server 110 can represent more than one computing device working together to perform the actions of a server computer (e.g., cloud computing). Further, server 110 can represent various forms of servers including, but not limited to a web server, an application server, a proxy server, a network server, a content server, etc., accessible to the computing devices 102-106.

Each of servers 120 can be a single computing device such as a computer server or can represent more than one computing device working together to perform the actions of a server computer (e.g., cloud computing). Server 110 and servers 120 may be implemented as a single server or across multiple servers. Servers 120 may perform various functionalities and/or storage capabilities described herein either alone or in combination with server 110. Each of servers 120 may host various services. For example, one of servers 120 may host services including cloud-based services.

A cloud-based service may include a service provided by cloud computing resources, such as, but not limited to, server 110, servers 120 and/or other computing resources accessible via one or more networks (e.g., network 108). A cloud-based service may include a social networking service. A social networking service may enable users to create a profile and associate themselves with other users of the social networking service. The phrase "social networking service" as used herein encompasses its plain and ordinary meaning, including, but not limited to, an online service, platform or site that focuses on building and reflecting of social associations among users. These associations may be stored within a social graph at each social networking service (e.g., maintained at servers 120). Such user associations may be defined on a user-to-user basis, or as a group of users associated through membership within a group. As used herein, "contacts" refer to other users that a user is associated with, at one or more social networking services. As used herein, a "post" generally refers to a content item shared by one user ("post owner") with one or more other users of the social networking service. The content item may include original content as well as preexisting content shared by the post owner. The content item may include text, images, video, audio, links, files, and/or other media.

A user may create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

In some aspects, server 110 may be a server for setting access controls for a content item. Server 110 may further maintain or be in communication with the services hosted on servers 120. Server 110 and/or servers 120 may further facilitate the generation and maintenance of a social graph including the user created associations. The social graphs may include, for example, a list of all users of the social networking service and their associations with other users of a social networking service.

In some aspects, servers 120 may host cloud-based services providing information regarding one or more geographical locations such as geographical information (e.g., longitude, latitude, and elevation), business listing information, or web pages or websites associated with the geographical location. For example, business listing information may include name, type, hours and address of the geographical location. Servers 120 may host cloud-based services for determining information regarding one or more geographical locations, such as providing search engines for identifying results for a user query, one or more user query services.

Users may interact with the system hosted by server 110, and/or one or more services hosted by servers 120, through a client application installed at the computing devices 102, 104, and 106. Alternatively, the user may interact with the system and the one or more services through a web based browser application at the computing devices 102, 104, 106. Communication between computing devices 102, 104, 106 and the system, and/or one or more services, may be facilitated through a network (e.g., network 108).

Communications between computing devices 102-106, server 110 and/or servers 120 may be facilitated through various communication protocols. In some aspects, computing devices 102-106, server 110 and/or servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
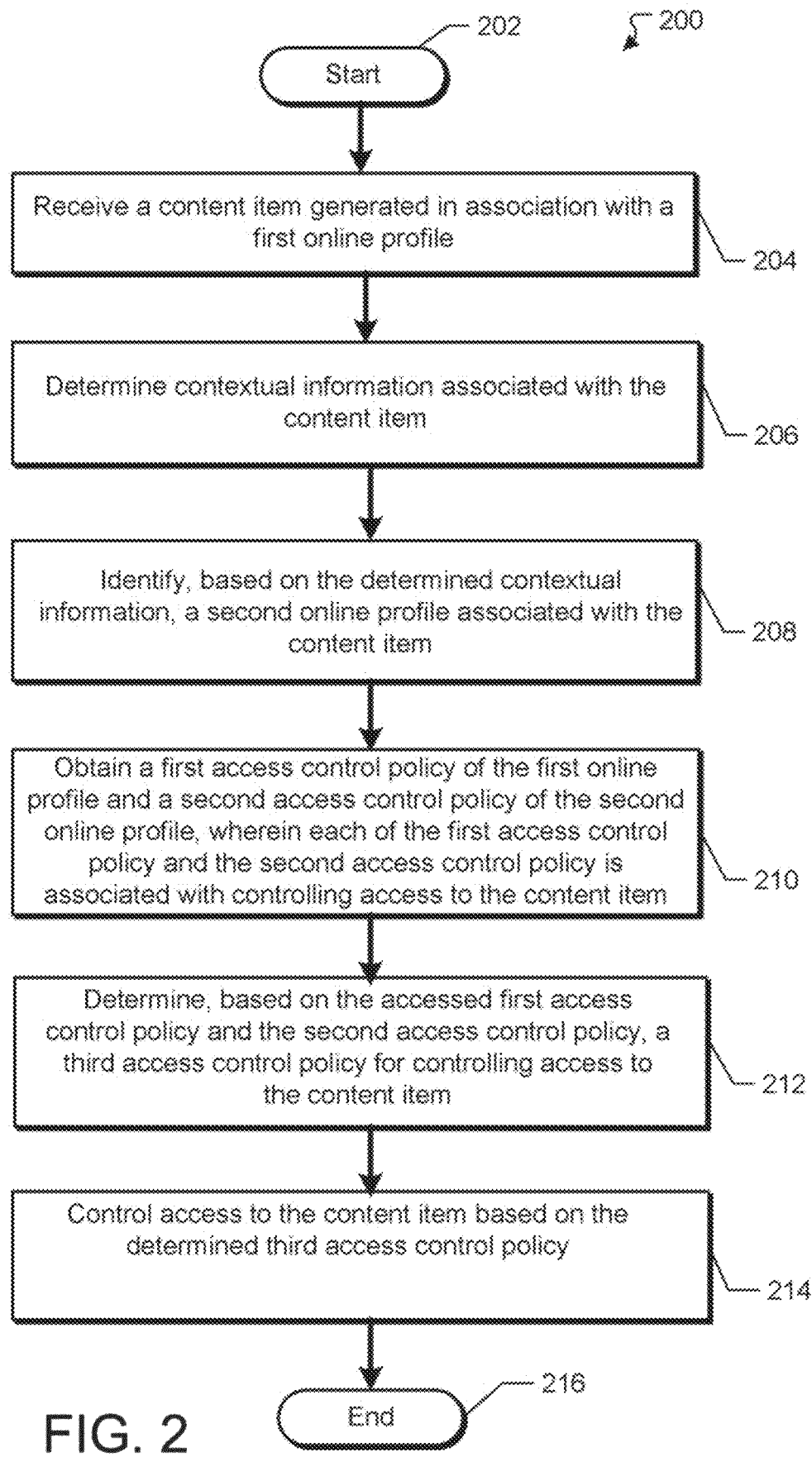
FIG. 2 illustrates a flow diagram of an example process for setting access controls for a content item.

FIG. 2 illustrates a flow diagram of an example process for setting access controls for a content item. Following start block 202, a content item generated in association with a first online profile is received by a server, such as server 110, at block 204. As noted above, the content item may include text, images, video, audio, links, files, and/or other content. For example, the content item may be a photo captured by computing device 102. The content item may include metadata, such as a geographic indicator, a timestamp, a face attribute, a voice attribute, a gait attribute and/or one or more environmental attributes indicating the environment when the content item is generated. In one example, the metadata may be embedded within the content item. The geographic indicator may include an address, latitude, longitude, or other indicator of a location when the content item was generated. In one example, Global Positioning System (GPS) and map data associated with computing device 102 may be used to tag locations with a plurality of labels. For example, a photo may be tagged as taken at a college and a post may be tagged as sent at a park near the water. The timestamp may be representative of when the content item was generated. The face attribute, voice attribute and gait attribute may be definable from the content item. The one or more environmental attributes may include lighting condition, environmental sounds and/or noises associated with the content item. For example, a photo may be captured when the user of computing device 102 was jogging in a park.

In some aspects, the first online profile may correspond to a user, such as a first user. For example, the first user may be the person who generated the content item, such as the user of computing device 102. The first user may be associated with a profile at a social networking service. As described above, a social networking service may enable users to create a profile and associate themselves with other users of the social networking service. The profile for each user at a social networking service may, for example, include a user name, user dates (e.g., birthday, anniversary, etc.), user location (e.g., home and/or business address), user preferences, calendar information, affinity and contact information, social activity associated with the user, and/or other similar information.

In some aspects, the first online profile may correspond to a location. For example, the first online profile may correspond to a location such as the Louvre. The Louvre may be registered on a registry as a museum located in France. In some aspects, the first online profile may correspond to a physical object. For example, the first online profile may correspond to a painting of Mona Lisa. The painting of Mona Lisa may be registered as associated with the Louvre.

At block 206, contextual information associated with the content item is determined. The contextual information may comprise at least one of geographical information, temporal information, environmental information or biometric identification information associated with the content item. In some aspects, the biometric identification information may comprise at least one of facial attributes, voice attributes or gait attributes. As described above, the content item may include metadata, such as a geographic indicator, a timestamp, a face attribute, a voice attribute, a gait attribute and/or environmental attributes indicating the environment when the content item is generated. The contextual information may be determined from the metadata associated with the content item.

In example aspects, determining the contextual information may comprise determining a type of geographical location associated with the content item. In some aspects, the type of geographical location may be associated with an atmosphere of the location (e.g., romantic or intimate). In example aspects, the type of geographical location may be associated with the context of an event related to the content item (e.g., business meeting or birthday party). The type of geographical location may include, for example, a restaurant, a school, a museum, a concert hall, an office and etc.

In one example, a location associated with the content item may be identified based on the contextual information, such as the geographical information. In one example, the location is determined based on the location of the device used to generate the content item during content generation, such as GPS and/or map data associated with the device. In one example, the content item may include geotags, such as GPS and/or map data associated with the content item. The geotags may be used to determine the location of the content. For example, a photo may be determined to be generated at 111 Street ABC, City XYZ, Calif. In one example, the location of the content item may be specified by the first online profile, such as the first user.

In some aspects, the type of geographical location may be determined based on the business listing information of the location. Business listing information of the location may be identified, for example, based on the business owners' website, third-party websites and street view information of the location. Business listing information may include name, type, hours and address of the location.

At block 208, based on the determined contextual information, a second online profile associated with the content item is identified. In some aspects, the second online profile may correspond to a user, such as a second user. The second user may be associated with a profile at a social networking service. In example aspects, the second user may be identified based on data from a social networking service regarding the first online profile and/or the second online profile.

In some examples, the second user may be identified based on one or more matching attributes between the contextual information and data from a social networking service regarding the second online profile. In one example, a time and location of a social activity of the second user may match with the contextual information of the content item, such as a time and location associated with the content item. For example, a second user may be identified to be in a beach party with the first user. In another example, the one or more matching attributes may include, for example, one or more matching facial attributes, voice attributes or gait attributes between the content item and the profile of the second user at a social networking service. For example, a seconder user may be identified from the picture taken with the first user at a bar.

In some examples, the second user may be identified based on a common attribute between the first online profile and the second online profile. The common attribute may be identified based on the data from a social networking service regarding the first online profile and the second online profile. In one example, the common attribute may be identified based on profiles of the first user and the second user at the social network service. The common attribute may include, for example, common user location, user preferences, calendar information, affinity and contact information, social activity associated with the user, and/or other similar information. In one example, the second user may be identified based on one or more matching attributes between the contextual information and a common attribute between the first online profile and the second online profile. For example, the second user may be identified based on that the second user is frequently going to one or more jazz concerts with the first user and the determined contextual information is associated with jazz concert ABC, even if the second user did not attend jazz concert ABC with the first user.

In another example, the second user may be identified based on an association with the first user to be in a social group, based on the social graph at the social networking service. As noted above, A user may create "social groups" (e.g., social circles) including one or more contacts to organize his/her associations. These associations may be stored within a social graph at each social networking service (e.g., maintained at servers 120). In one example, the second user may be identified based on one or more matching attributes between the contextual information and an association with the first user to be in a social group. For example, the second user may be identified based on that the determined contextual information is associated with a family event and the second user is associated with the first user as a family member.

In some aspects, the second online profile may correspond to a location. As noted above, a location associated with the content item may be identified based on the contextual information, such as the geographical information. In example aspects, the second online profile may correspond to a physical object. The physical object may be detected based on the content item in various ways, including by object recognition. The physical object may be registered online with a verified registration system to be put on a registry, for example, by the owner of the physical object. In some aspects, the physical object may be registered to be associated with, for example, a landmark, a business, a residence, a venue, a scheduled event, a pop-up event, a place associated with an occurrence. For example, a painting of the Mona Lisa may be registered with the Louvre.

At block 210, a first access control policy of the first online profile and a second access control policy of the online profile are obtained. Each of the first access control policy and the second access control policy is associated with controlling access to the content item. In some aspects, each of the first access control policy and the second access control policy may comprise a policy for at least one of owning, editing, deleting or sharing the content item.

In some aspects, the first access control policy and the second access control policy may be based on user-specified preferences by the first online profile and the second online profile, respectively. For example, the first online profile (e.g., a user) may specify the first access control policy via a graphical interface when the user is logged into his user profile as "I like to share ownership of photos at work with my work colleagues and friends, but not my grandma." In example aspects, the first access control policy and the second access control policy may be based on activity within a social networking service corresponding to the first online profile and the second online profile, respectively. In one example, the first access control policy may be determined based on the historical information associated with the first online profile and the second online profile, for example, include previously attended events and/or visited locations associated with the first online profile and the second online profile. For example, the first access control policy may be determined as sharing ownership of photos taken at a concert with the friends who have previously attended the concert with me.

In example aspects, the first access control policy and/or the second access control policy may be based on a type of geographical location associated with the content item. In one example, the first access control policy may be associated with one or more friends of the first online profile who has previously been to the same type of geographical location. For example, the first access control policy may be associated with friends who usually visits places labelled as "bar" should co-own the photo of the first online profile taken at a bar, while parents should not.

In some aspects, the first access control policy and/or the second access control policy may be based on a location or physical object corresponding to the first online profile and/or second online profile. In one example, the first online profile may correspond to a location such as the Louvre, as described as above. The Louvre may be registered on a registry as a museum located in France. The first access control policy may include that the Louvre automatically co-owns all photos of the Mona Lisa painting taken within the Louvre. In another example, the first online profile may correspond to a physical object, as described as above. For example, the first online profile may correspond to a painting of Mona Lisa. The painting of Mona Lisa may be registered as associated with the Louvre. The first access control policy may include that the Louvre automatically co-owns all photos of the Mona Lisa taken within the Louvre.

In some aspects, each of the first access control policy and the second access control policy may be associated with controlling access to the content item and/or information related to the content item during a predetermined period of time. Each of the first access control policy and the second access control policy may comprise a policy for at least one of owning, editing, deleting or sharing the content item and/or information related to the content item. In one example, the policy for owning the content item may include an authorized user as an owner of the content item and one or more access rights of the owner including viewing, editing, deleting, copying, saving and transferring the content item and/or information related to the content item. For example, the first access control policy may include user A as an owner of a photo taken by user A and user A may have access rights of viewing, editing, deleting, copying, saving and transferring the photo and/or information related to the photo, such as time information related to the photo.

In one example, information related to the content item may be identified based on calendar information, trajectory information and/or time information associated with the first online profile and the second online profile. Calendar information may include information related to an event created by a calendar application, such as a subject of the event created, one or more invitees of the event, description of the event, time and/or geographical location associated with the event. Trajectory information may include a route or path that the first online profile and/or the second online profile follow through space as a function of time. For example, trajectory information may include a route, such as Highway xyz, and real-time geographical information associated with the first online profile during the time spent on the route, such as between 8AM to 10 AM.

In one example, the first access control policy and/or the second access control policy may be associated with controlling access to information related to the content item in a subsequent or prior time period of an event associated with the content item. In one example, the first access control policy and/or the second access control policy may include a retroactive access control policy, such as controlling access to information associated with a time period before the content item is created. For example, the first user may set a first access control policy that if the first user and the second user meet each other from opposite sides of the city, all pictures they took an hour before or after their meeting are co-owned by the first user and the second user. The second user may set a second access control policy that if the first user and the second user meet each other from opposite sides of the city, the second user may share the trajectory information before or after their meeting with the first user. At block 212, a third access control policy for controlling access to the content item is determined based on the first access control policy and the second access control policy. In some aspects, the first access control policy and the second access control policy may be compared. Conflicts between the first access control policy and the second access control policy may be identified based on the comparison. The conflicts may be resolved based on a conflict-resolution rule. An example process for determining a third access control policy for controlling access to the content item based on the first access control policy and the second access control policy will be described in more details as below with reference to FIG. 3.

At block 214, access to the content item is controlled based on the determined third access control policy. The determined third access control policy may be applied to control access to the content item, such as at least one of owning, editing, deleting or sharing the content item. In some aspects, the third access control policy may be applied to control access to the content item after modifying the content item. The content item (e.g., a photo with both user A and user B) may be modified by applying one or more digital signal processing filters, such as to remove the face of user A by blurring the face of user A. In some aspects, the one or more digital signal processing filters may be applied to filter an audio of user A by tuning the one or more digital signal processing filters, based on user A's audio samples. The modified content item may be saved as a different version of the original content item. The determined third access control policy may be applied to control access to the modified content item, such as at least one of owning, editing, deleting or sharing the modified content item.

Figure 3:
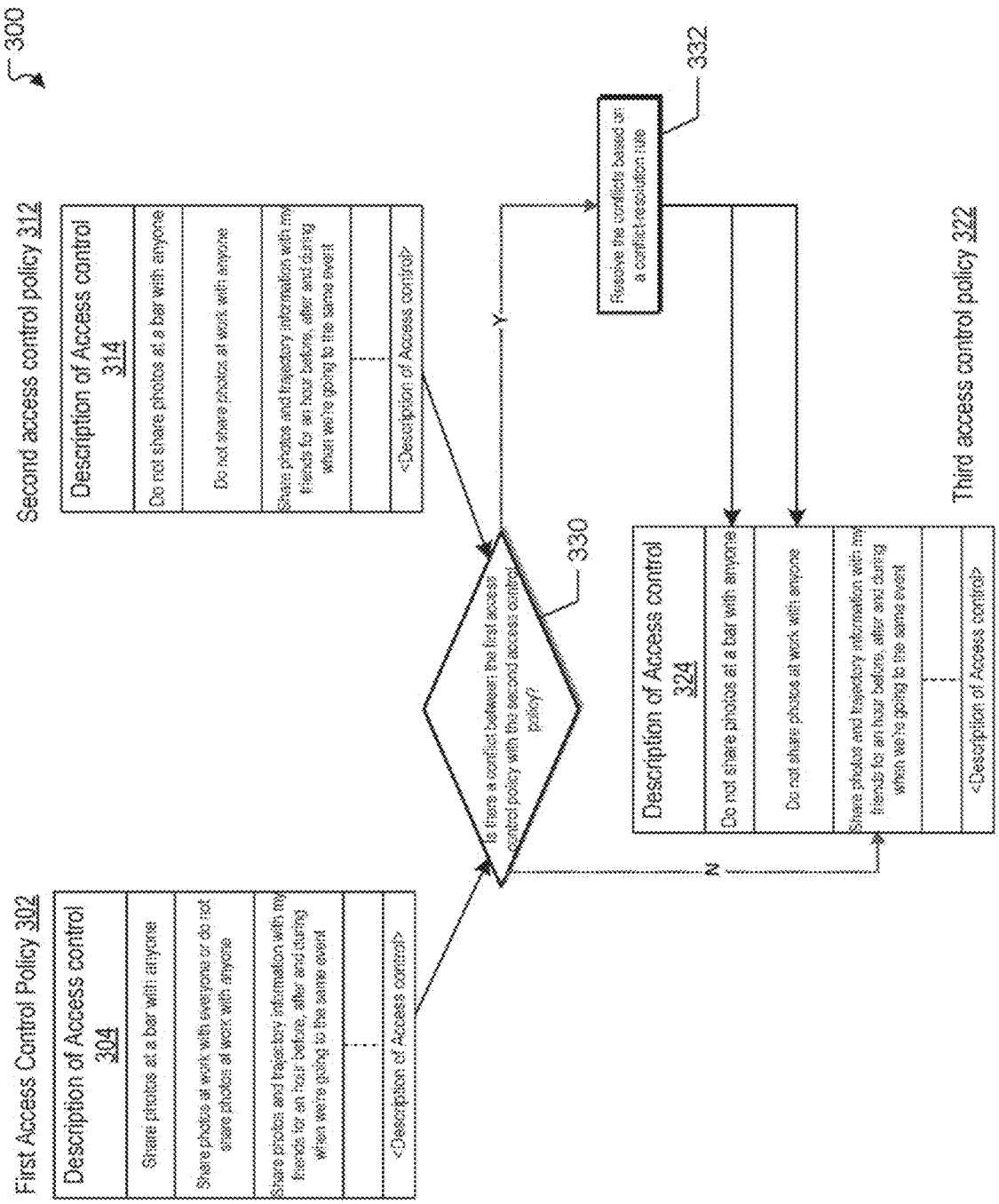
FIG. 3 illustrates a flow diagram of an example process for determining a third access control policy based on the first access control policy and the second access control policy.

FIG. 3 illustrates a flow diagram of an example process for determining a third access control policy based on the first access control policy and the second access control policy. A first access control policy 302 and a second access control policy 312 may be stored on a server, such as server 110 or one of servers 120 First access control policy 302 and second access control policy 312 may be determined as described in details with reference to FIG. 2.

First access control policy 302 can correspond to a data structure with various fields, for example, the fields depicted in the description of access control 304. However, first access control policy 302 is not limited thereto. Description of access control 304 may include, for example, "share photos at a bar with anyone", "share photos at work with everyone or do not share photos at work with anyone" and "share photos and trajectory information with my friends for an hour before, after and during when we're going to the same event", as depicted in FIG. 3. However, description of access control 304 is not limited thereto.

Second access control policy 312 can correspond to a data structure with various fields, for example, the fields depicted in the description of access control 314. However, second access control policy 312 is not limited thereto. Description of access control 314 may include, for example, "do not share photos at a bar with anyone", "do not share photos at work with anyone" and "share photos and trajectory information with my friends for an hour before, after and during when we're going to the same event", as depicted in FIG. 3. However, description of access control 314 is not limited thereto.

Third access control policy 322 can correspond to a data structure with various fields, for example, the fields depicted in the description of access control 324. However, third access control policy 322 is not limited thereto.

At decision block 330, any conflict between first access control policy 302 and second access control policy 312 is determined. In some aspects, the determination may be made by the server, such as server 110. In some aspects, the conflict may include one or more mismatches between first access control policy 302 and second access control policy 312. In one example, a conflict may be determined based on a complete mismatch between "share photos at a bar with anyone" in first access control policy 302 and "do not share photos at a bar with anyone" in second access control policy 312. In another example, a conflict may be determined based on a partial mismatch between "share photos at work with everyone or do not share photos at work with anyone" in first access control policy 302 and "do not share photos at work with anyone" in second access control policy 312.

At decision block 330, if it is determined that there is a conflict between first access control policy 302 and second access control policy 312, the conflict is resolved based on a conflict-resolution rule at block 332. In example aspects, a market system may be used to apply the conflict-resolution rule. In the market system, access control policies (e.g., first access control policy 302 and second access control policy 312) may be framed as bids and asks, and an access control policy that satisfy both first access control policy 302 and second access control policy 312 is paired off and applied as third access control policy 322. In some aspects, the conflict-resolution rule may maximize the maximum between first access control policy 302 and second access control policy 312 based on one or more parameters in first access control policy 302 and second access control policy 312. The one or more parameters may include one or more required parameters and/or optional parameters.

As described above, a conflict may be determined between "share photos at a bar with anyone" in first access control policy 302 and "do not share photos at a bar with anyone" in second access control policy 312. First access control policy 302 may include "share photos at a bar with anyone" as a required parameter. Second access control policy 312 may include "do not share photos at a bar with anyone" as a required parameter. The conflict resolution rule may maximize the maximum from first access control policy 302 and second access control policy 312 by satisfying the required parameters in first access control policy 302 and/or second access control policy 312. The conflict may be resolved by applying third access control policy 322 including, for example, "do not share photos at a bar with anyone".

As described above, a conflict may be determined between "share photos at work with everyone or do not share photos at work with anyone" in first access control policy 302 and "do not share photos at work with anyone" in second access control policy 312. First access control policy 302 may include "share photos at work with everyone" as a required parameter and "do not share photos at work with anyone" as an optional parameter. Second access control policy 312 may include "do not share photos at work with anyone" as a required parameter. The optional parameter of first access control policy 302 may satisfy the required parameter of second access control policy 312. The conflict resolution rule may maximize the maximum from first access control policy 302 and second access control policy 312 by satisfying the required parameters from first access control policy 302 and/or second access control policy 312. The conflict may be resolved by applying third access control policy 322 including, for example, "do not share photos at work with anyone".

In some aspects, the conflict resolution rule may modify the content item to satisfy first access control policy 302 and second access control policy 312. In one example, first access control policy 302 may include "do not show my face in the photos with my friends at a bar" and second access control policy 312 may include "share photos at a bar with anyone". The conflict resolution rule may satisfy both of first access control policy 302 and second access control policy 312 by modifying the photo at a bar with removing the face of the first user associated with first access control policy 302. As described as above, the content item (e.g., a photo with both user A and user B) may be modified by applying one or more digital signal processing filters, such as to remove the face of user A by blurring the face of user A.

At decision block 330, if it is determined that there is no conflict between first access control policy 302 and second access control policy 312, third access control policy 322 is determined based on first access control policy 302 and second access control policy 312. As described above, no conflict may be determined between "share photos and trajectory information with my friends for an hour before, after and during when we're going to the same event" in first access control policy 302 and second access control policy 312. Third access control policy 322 may be determined to include "share photos and trajectory information with my friends for an hour before, after and during when we're going to the same event".

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from a content server (e.g., server 110) that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content server.

Figure 4:
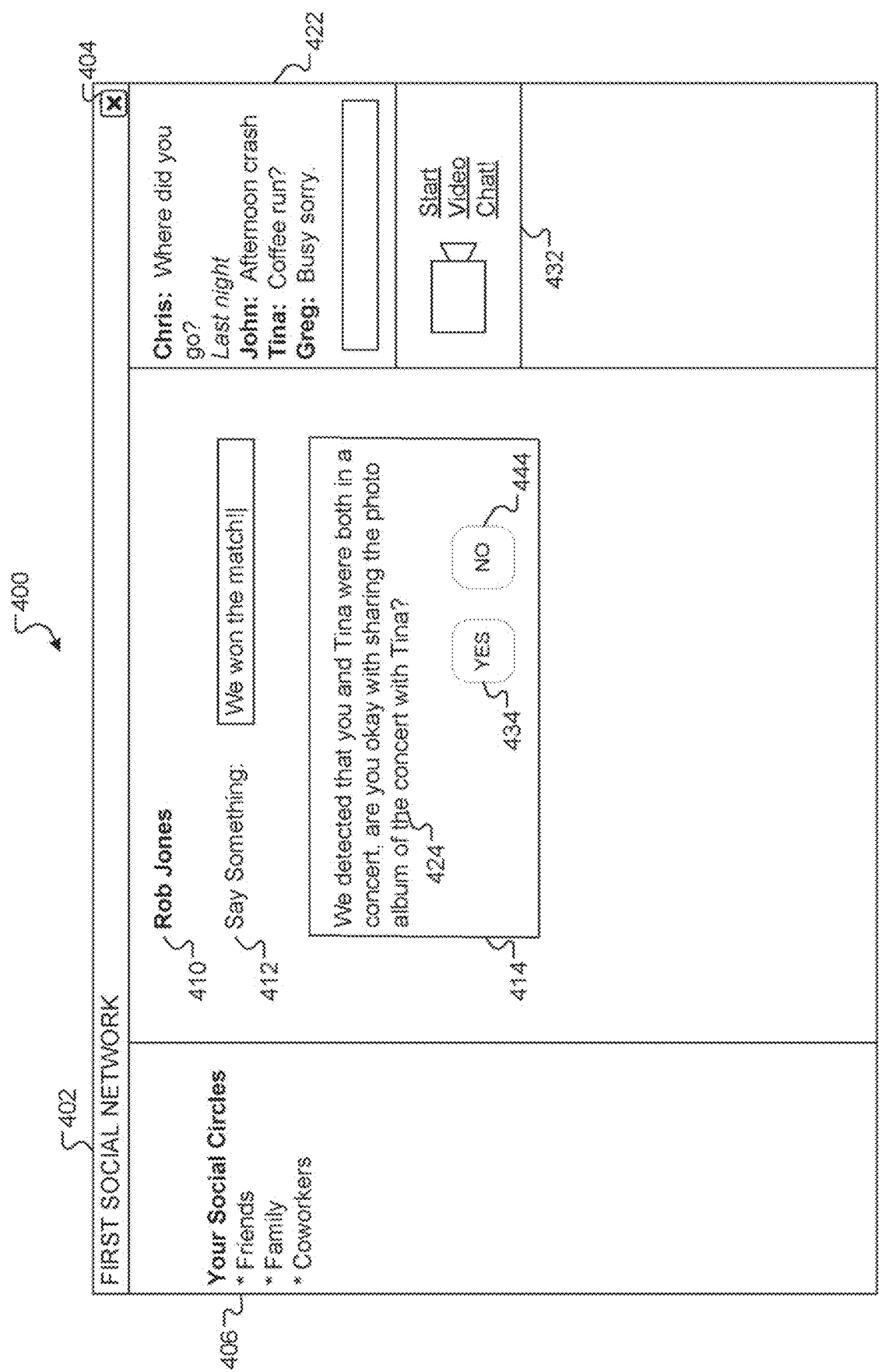
FIG. 4 illustrates an example interface configured to display setting access controls for a content item.

FIG. 4 illustrates an example interface 400 (e.g., a web browser window, a native application on a mobile device) configured to display setting access controls for a content item.

As shown, interface 400 includes a title bar 402, a close button 404, lists of social network groups 406, an indication of a user 410, and content items 412, 422 and 432 associated with user 410 being displayed. A notification area 414 is displayed to provide a notification to user 410. User 410 may be a user of interface 400 who may be logged into a social networking service.

The title bar 402 may display a title of the web page being displayed or the name of a provider of the web page, for example, "First Social Network." Close button 404, when clicked, is configured to cause interface 400 to be closed. The list of social circles 406 may include one or more social circles associated with user 410. For example, user 410 may have social circles titled "Friends," "Family," and "Coworkers." The indication of user 410 indicates that information about user 410 is being displayed in interface 400. The indication of user 410 may include a name of user 410. In one example, the indication of user 410 may include one or more photographs of user 410. An input box 412 may be provided to allow user 410 to enter information, such as saying something like "We won the match".

The content of a chat session 422 including subject members of a social network group associated with user 410 may be displayed. However, one or more of the participants in the chat session may have his/her chat sessions displayed to the viewing members of the social network group. In addition, a button or link to start a video chat session 432 with one or more members of a social network group associated with user 410 may be provided.

Notification area 414 includes a notification description area 424, a "YES" button 434 and a "NO" button 444. Notification description area 424 may include description of a content item, a first and/or second online profile, a first and/or second access control policy, for example, as described in conjunction with FIGS. 2-3. Notification description area 424 displays, for example, "We detected that you and Tina were both in a concert, are you okay with sharing the photo album of the concert with Tina". User 410 may accept an access control policy indicated in notification description area 424 by using the "YES" button 434. User 410 may reject an access control policy indicated in notification description area 424 by using the "No" button 444.

In situations in which the systems discussed here collect personal information about users (e.g., user 410), or may make use of personal information, the users may be provided with an opportunity to control whether programs or features collect user information (e.g., information about a user's social network, social actions or activities, profession, a user's preferences, or a user's current location), or to control whether and/or how to receive content from a content server (e.g., server 110) that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content server.

Figure 5:
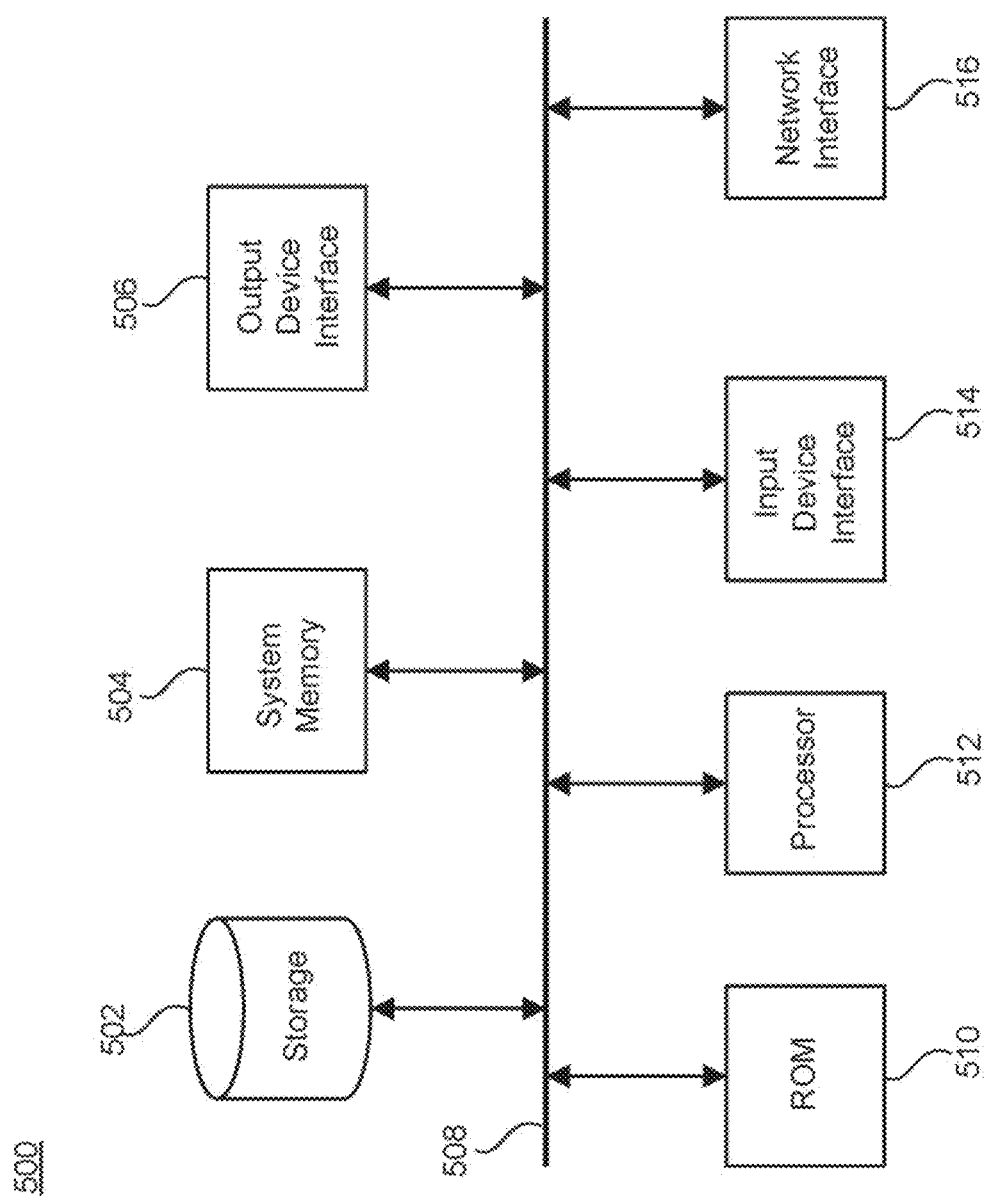
FIG. 5 conceptually illustrates an example electronic system with which some implementations of the subject technology can be implemented.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for setting access controls for a content item in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for Use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method comprising:
   receiving one or more photos generated in association with a first online profile associated with a first user;
   determining contextual information associated with the one or more photos;
   determining a group comprising a plurality of online profiles other than the first user profile;
   identifying, based on the determined contextual information and the determined group, a second online profile associated with the one or more photos;
   obtaining a first access control policy of the first online profile and a second access control policy of the second online profile, each of the first access control policy and the second access control policy is associated with controlling access to the one or more photos; and
   determining, based on the obtained first access control policy and the obtained second access control policy, whether the one or more photos are shareable with a second user associated with the second online profile.

2. The method of claim 1, further comprising:
   controlling access to the one or more photos based on a third access control policy,
   wherein when a conflict is detected between the first access control policy and the second access control policy, the third access control policy allows the access to the one or more photos by modifying the one or more photos.

3. The method of claim 2, further determining the third access control policy by:
   comparing the first access control policy with the second access control policy;
   identifying, based on the comparison, conflicts between the first access control policy and the second access control policy; and
   resolving the conflicts based on a conflict-resolution rule.

4. The method of claim 1, further comprising:
   providing, for presentation to the first online profile, a suggestion to share the one or more photos with a second user associated with the second online profile; and
   upon receiving a confirmation from the first user, sharing the one or more photos with the second user.

5. The method of claim 1, wherein the contextual information comprises at least one of a location associated with the one or more photos, a time associated with the one or more photos or a face attribute associated with the one or more photos.

6. The method of claim 5, further comprising determining the contextual information based on a social activity associated with the one or more photos.

7. The method of claim 6, wherein determining the contextual information comprises determining at least one of calendar information, geographical information, and time information of the social activity associated with the one or more photos.

8. The method of claim 1, wherein the first access control policy allows the first online profile to share ownership of the one or more photos with the second online profile.

9. A non-transitory machine-readable medium comprising instructions stored therein, which when executed by a system, cause the system to perform operations comprising:
   receiving one or more photos generated in association with a first online profile associated with a first user;
   determining contextual information associated with the one or more photos;

determining a group comprising a plurality of online profiles other than the first user profile;

identifying, based on the determined contextual information and the determined group, a second online profile associated with the one or more photos;

obtaining a first access control policy of the first online profile and a second access control policy of the second online profile, each of the first access control policy and the second access control policy is associated with controlling access to the one or more photos; and determining, based on the obtained first access control policy and the obtained second access control policy, whether the one or more photos are shareable with a second user associated with the second online profile.

10. The non-transitory machine-readable medium of claim 9, the operations further comprising:

controlling access to the one or more photos based on a third access control policy, wherein when a conflict is detected between the first access control policy and the second access control policy, the third access control policy allows the access to the one or more photos by modifying the one or more photos.

11. The non-transitory machine-readable medium of claim 10, further determining the third access control policy by:

comparing the first access control policy with the second access control policy;

identifying, based on the comparison, conflicts between the first access control policy and the second access control policy; and resolving the conflicts based on a conflict-resolution rule.

12. The non-transitory machine-readable medium of claim 9, the operations further comprising:

providing, for presentation to the first online profile, a suggestion to share the one or more photos with a second user associated with the second online profile; and upon receiving a confirmation from the first user, sharing the one or more photos with the second user.

13. The non-transitory machine-readable medium of claim 9, wherein the contextual information comprises at least one of a location associated with the one or more photos, a time associated with the one or more photos or a face attribute associated with the one or more photos.

14. The non-transitory machine-readable medium of claim 13, the operations further comprising determining the contextual information based on a social activity associated with the one or more photos.

15. The non-transitory machine-readable medium of claim 14, wherein determining the contextual information comprises determining at least one of calendar information, geographical information, and time information of the social activity associated with the one or more photos.

16. The non-transitory machine-readable medium of claim 9, wherein the first access control policy allows the first online profile to share ownership of the one or more photos with the second online profile.

17. A system comprising;

a memory storing instructions, and a processor to execute the instructions to perform operations comprising:

receiving one or more photos generated in association with a first online profile associated with a first user;

determining contextual information associated with the one or more photos;

determining a group comprising a plurality of online profiles other than the first user profile;

identifying, based on the determined contextual information and the determined group, a second online profile associated with the one or more photos;

obtaining a first access control policy of the first online profile and a second access control policy of the second online profile, each of the first access control policy and the second access control policy is associated with controlling access to the one or more photos; and determining, based on the obtained first access control policy and the obtained second access control policy, whether the one or more photos are shareable with a second user associated with the second online profile.

18. The system of claim 17, the operations further comprising:

controlling access to the one or more photos based on a third access control policy, wherein when a conflict is detected between the first access control policy and the second access control policy, the third access control policy allows the access to the one or more photos by modifying the one or more photos.

19. The system of claim 17, the operations further comprising:

providing, for presentation to the first online profile, a suggestion to share the one or more photos with a second user associated with the second online profile; and upon receiving a confirmation from the first user, sharing the one or more photos with the second user.

20. The system of claim 17, wherein the contextual information comprises at least one of a location associated with the one or more photos, a time associated with the one or more photos or a face attribute associated with the one or more photos.

* * * * *